United States Patent [19]

Froehlich et al.

[11] 3,728,481

[45] Apr. 17, 1973

[54] METHOD FOR IMPROVING THE ACCURACY OF EVALUATING CERTAIN OBJECTS IN THE FIELD OF A RASTER SCAN

[75] Inventors: Walter Froehlich, Karlsruhe; Walter Lang, Aalen, both of Germany

[73] Assignees: Carl Zeiss-Stiftung, Wuerttemberg; Siemens Aktiengesellschaft, Munich, Germany

[22] Filed: Mar. 10, 1971

[21] Appl. No.: 122,675

[30] Foreign Application Priority Data

Mar. 11, 1970 Germany....................P 20 11 470.9

[52] U.S. Cl...............................178/7.1, 178/DIG. 34

[51] Int. Cl...............................................H04n 5/14

[58] Field of Search.................178/7.1, 7.2, DIG. 39, 178/DIG. 25, DIG. 26, DIG. 33, DIG. 34

[56] References Cited

UNITED STATES PATENTS

| | | | |
|---|---|---|---|
| 2,965,711 | 12/1960 | James | 178/7.2 |
| 3,389,221 | 6/1968 | MacDonald | 178/7.2 |
| 2,903,507 | 9/1959 | Kovasznum et al. | 178/DIG. 34 |
| 3,586,773 | 6/1971 | Niemyer et al. | 178/7.2 |
| 3,019,290 | 1/1962 | Perkins | 178/7.2 |

*Primary Examiner*—Robert L. Griffin
*Assistant Examiner*—Joseph A. Orsino, Jr.
*Attorney*—Sandoe, Hopgood & Calimafde

[57] ABSTRACT

The invention contemplates a method and means for evaluating an area or other function of an object scanned within the field of view of a raster-scan device such as a TV camera. A control video signal is first formed for a complete raster and is stored. It is then used as a basic reference for creating the video signal developed upon subsequent scanning of an object or objects in the same field of view as that comprehended by the original control video signal. In the form specifically disclosed, the stored video signal is used to control the amplification of newly produced video signal, in synchronism with the raster development thereof. The invention is described in the context of area evaluation of scanned objects, wherein amplitude-discrimination techniques are relied upon to make an additional evaluation of object brightness.

10 Claims, 3 Drawing Figures

METHOD FOR IMPROVING THE ACCURACY OF EVALUATING CERTAIN OBJECTS IN THE FIELD OF A RASTER SCAN

The invention concerns a method and means for evaluating certain objects in a given field, using raster-scan techniques and a modified video signal to create a displayed evaluation. Raster-scan methods are those in which the field is scanned linearly in rows, spirals or any other way and a video signal is produced in accordance with brightness scanned in the field. In the use of such techniques, for example, for bacteriological studies or for evaluating metal sections and the like, certain objects of the picture are selected and evaluated on the basis of brightness of the video signals, and they can be represented on the screen of a display unit. The picture can also be evaluated according to the gray tone or value of the objects. But is is frequently desired to be able to select or classify the individual objects according to size. And, for situations in which a number of objects is to be evaluated, it is desirable to employ techniques which lend themselves to automation, as in the stereometric and densitometric analysis of pictures.

In the automatic stereometric analysis of pictures taken by television-camera techniques, any local irregularity in the illumination of the picture background and/or in the sensitivity of the television camera tube used for scanning the picture will effect a reduction in the already limited number of usable gray tones. And if one limits the measuring field used for picture analysis to a sufficiently small fraction of the maximum possible measuring field, there can be assurance that all available gray tones will be used in this smaller field; but this approach requires a greater number of measurements, which is particularly burdensome when evaluating large numbers of objects in extended pictures, so that the time required for a complete analysis increases to an extent which is frequently not justifiable.

The problem of picture-background brightness is essentially the same in photoelectric scanning devices of the flying-spot variety, wherein the luminous spot of a cathode-ray-tube scanner is caused, through an illuminating optical system, to scan the selected object and, through an observing optical system, to be observed by a photoelectric receiver, for example, a secondary electron multiplier. However, an intensity drop toward the margin of the picture is unavoidable, due to use of an optical system and/or to local inhomogeneities in the transparent specimen holder; such factors effect undesired amplitude modulation of the resulting video signal, with resultant degradation of the video signal for the object of interest, to be evaluated. For this reason, flying-spot devices have only limited use in densitometric measurements, whether the objects are observed using transmitted light or by reflection of incident light. And no optical compensation for irregular illumination of the picture is feasible, particularly when the illuminating optical system and the observing optical system must be frequently replaced for purposes of changing the observed scale or size of the image.

As a practical matter, television apparatus and flying-spot devices can be used for picture analysis in routine operation only when irregular illumination of the picture can be compensated automatically.

Furthermore, in making stereometric analyses, it is often necessary separately to measure and evaluate different picture components which differ in their gray value. Since the amplitude of the electrical video signal developed by the camera is a measure of the gray value, the latter can be determined by means of a threshold value for the electrical signal. If a single threshold value is used for this purpose, the gray value can be ascertained only through successive measurements, using a different threshold value for each brightness; the picture components of actual interest must then be obtained by differentiation of the measuring results from two adjacent gray tones. Such measurement can be carried out much more simply if two threshold values are used instead of one, for limiting the gray values of interest; a so-called discriminator window is thus obtained to block out all existing gray values except for those with a certain amplitude. The technique of making successive measurements, with stepped adjustment of the discriminator window and constant width of the latter, lends itself to automation. However, this method is unsatisfactory, in that it assumes substantially equal spacing of the stepped gray-value threshold settings, i.e., of the object classifications, whereas the gray values of the object classes of interest are not equidistant from each other, being irregularly spaced from each other. And the irregularly spaced situations are found almost exclusively in practice. For this reason, a method is desired which permits one to effectively eliminate from the total picture those objects which are not of interest or which have already been evaluated, so that the adjustments and measurements for the remaining objects can be facilitated, and accuracy may be enhanced.

In the evaluation of pictures taken by television cameras or flying-spot devices, certain interfering signals appear superposed on the video signal, with degrading effect on the video signal attributable to the scanned object, so that accuracy of the evaluation is impaired. It is desirable to increase the period of time between such signal-degrading events, i.e., to reduce their frequency of occurrence.

Accordingly, it is an object of the invention to provide a method and means whereby the above-described difficulties can be eliminated or substantially reduced. Specifically, it is an object to provide a method and means for automatically compensating for irregular illumination of the picture field and/or local-area differences in sensitivity of the signal electrode of a television camera tube. Specifically also, it is an object to provide automatic correction of the intensity drop at the margin of the picture produced by flying-spot devices. In addition, it is an object to provide means whereby picture components which are not of interest or which have already been evaluated may be eliminated from the plot or reproduction on the display unit. Finally, the interference interval is to be improved.

The invention achieves these objects by forming and storing a reference or control signal such that it may be called from storage in synchronism with the taking of the picture to be evaluated, and used for controlling the amplitude of the freshly developed video or measuring signal. By "synchronism" is meant that the reference signal is called from storage at such a time and with such a velocity that the freshly developed video signals appearing at the same time correspond to the same elements of the TV raster. Preferably, the degree of amplification of an amplifier for the fresh video signal is regulated by the control signal. And if desired, the sensitivity of the camera can also be influenced by the reference signal.

For compensating irregular illumination of the picture or variations in sensitivity at different areas of the camera, a "blind" picture is preferably taken and stored, and the stored signal is used as a control signal. When this signal is called from the storage, it controls the amplitude of the measuring signal so as to keep the sensitivity of the camera constant. By "blind" picture is meant a picture taken under the same conditions as for the picture to be evaluated, but with no object in the "blind" picture. The object carrier or mount is thus preferably the subject of the "blind" exposure for which video signal is placed in storage. In a more extended total field, which must be evaluated by taking several pictures, the "blind" exposure can be taken by first selecting an area where there is no object. The object-measuring signal is controllable to keep the sensitivity of the camera constant, but this does not mean that the sensitivity of the camera is changed; rather, the illuminating unit or the degree of amplification of a series-connected signal-amplifier can be adjusted. Further alternatively, the stored control signal can be superposed on the measuring signal, for effecting the desired correction. As a result, it cannot be determined from the output of the amplifier where or whether the adjustment has been made.

The "blind" picture has generally a lower limiting frequency since the irregularities of the background, of the illumination or of the sensitivity of the signal plate of the camera tube are characterized by relatively slow or small variation, over the entire picture. The "blind" video signal to be stored is, therefore, preferably passed through a low-pass filter, to assure suppression of any high-frequency peaks of interference voltage.

In order to effectively eliminate objects which are not of interest or which have already been evaluated, the object-measuring signals of the latter are preferably stored as control signals, and the object-measuring video signal is blocked during the read-out of these control signals. To this end, the measuring signals of the complete picture supplied by the television camera or by the flying-spot device, or the stored signals of the objects to be eliminated, are fed in synchronism to a subtraction stage, and the resulting differential signals may be evaluated in a series-connected analog computer for the stereometric analysis; the differential signals may also be represented on the screen of a display unit. In an illustrative use of this technique, at first only the first object hit by the scanning beam is selected for evaluation, and then the object-measuring video signal of this object is stored; then, in the next shot of the total picture, the object-measuring video signal of the first object is blanked by the stored signal, while the video signal for the second object is evaluated and then stored; thereafter, other objects are correspondingly selected, evaluated and stored, in successive steps. The various objects in the field can thus be sorted according to gray value and position.

To improve the interference interval, i.e., to reduce the frequency of occurrence of degrading through random voltage interference, the method of the invention contemplates exposure and storage for the video signal of a total picture, followed by re-exposure and new video-signal development and storage, in several cycles of exposure and storage, each new video signal being superposed on the respective previously stored video signals; finally, the summation signal, representing summation of all video signals for such re-exposures, is taken and stored as the signal to be evaluated. If the video signals of a given picture are thus stored, for the case of $n$ re-exposures to the field, they are fed to the storage at a maximum level which is $1/n$th of the highest admissible amplitude for storage, and video signals of homologous picture points are added. The addition of the video signals of homologous picture points is preferably effected using plate-storage means having two different channels or tracks; for example, the top side and the underside of a plate may be used in alternation.

The invention as well as additional advantages and details will be described more fully below in connection with the accompanying drawings, using examples from the field of stereometric analysis of microscopic objects. In said drawings.

Figure 1:
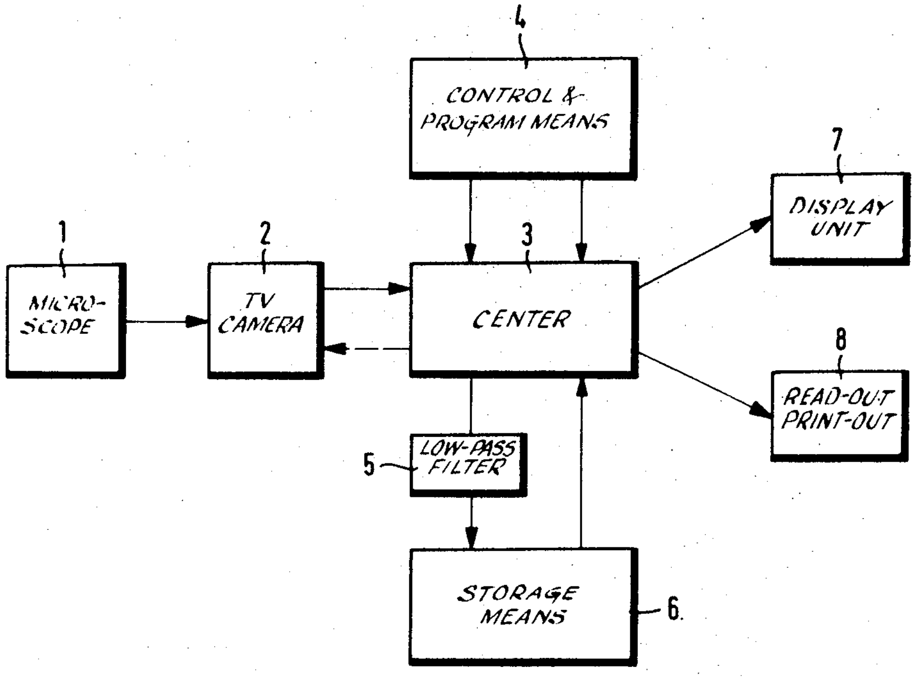
FIG. 1 is a block diagram of circuit means employing a television camera for carrying out the new method.
Figure 1A:
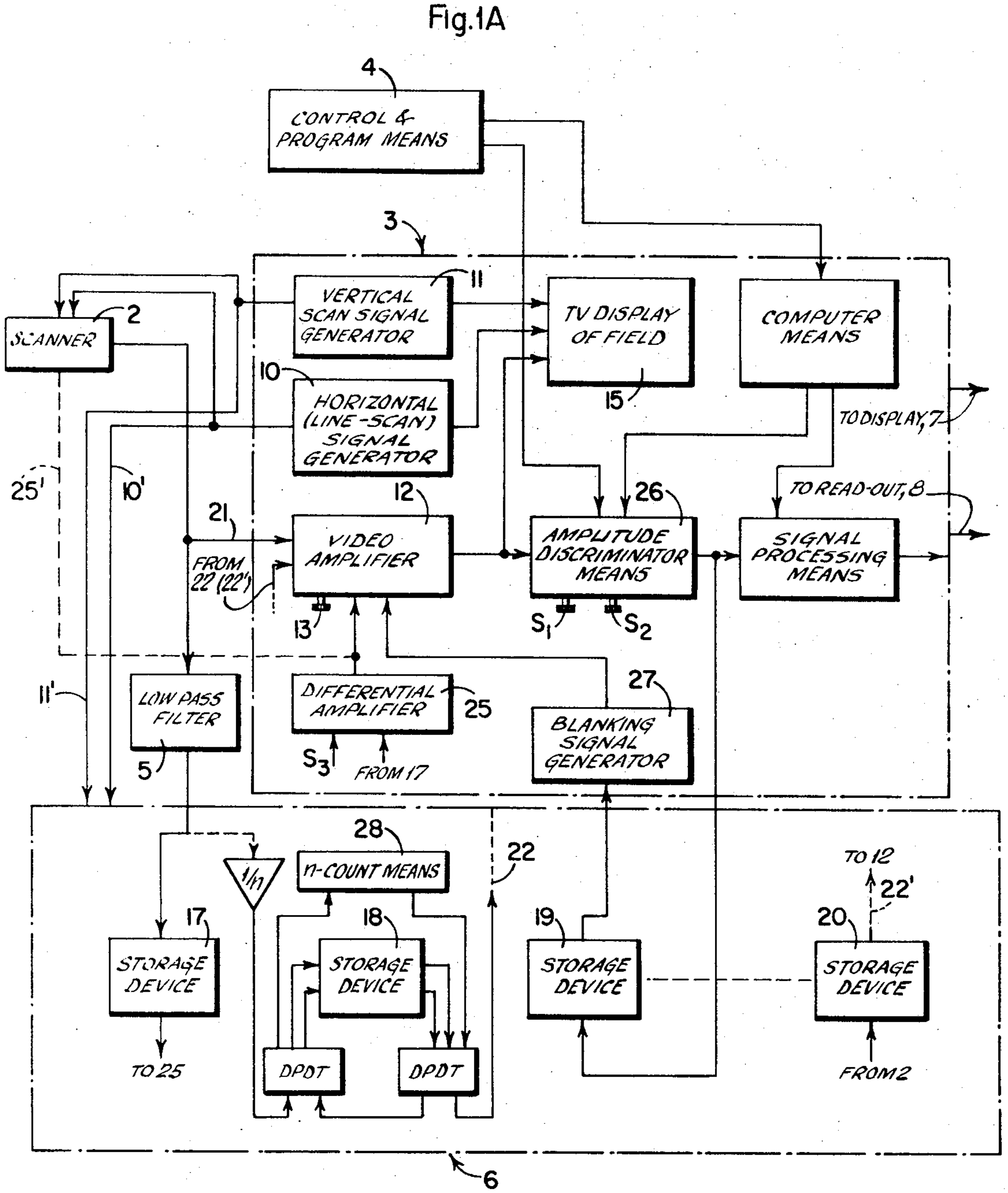
FIG. 1A is a similar diagram providing further detail for the circuit diagram of FIG. 1.

In FIG. 1, a television camera 2 transforms the image taken by a microscope 1 into an electrical video signal and feeds the same to a signal-generating, processing and control center 3. The latter contains, in addition to the usual deflection-signal generators 10–11 for camera 2 and a display unit 7, a video amplifier 12 with means 13 providing an adjustable degree of amplification. In addition, an amplitude discriminator 26 and additional signal-processing and evaluating instruments are provided at the center for response to an operation upon the video signal. Connected to the center is storage means 6 for video signals in which can be written not only the complete video signal supplied by the camera, but also the output signals of the signal-processing or evaluating circuits; as shown in FIG. 1A, the video signal is accommodated by the first of a plurality of storage devices 17 to 20, all synchronized with the basic raster scan, as suggested by connections 10′–11′. Thus, storage functions at 6 are so controlled by the center that it runs in synchronism with the scanning beam of camera 2; therefore, when a selected stored signal is called into the center (line 6′), storage signals and video signals arrive simultaneously, for corresponding parts of the raster. The storage devices at 6 are preferably of the plate-storage variety, but it will be understood that a storage tube, or a band or drum-storage means can also be used. In the form shown, a low-pass filter 5 is interposed between center 3 and storage 6 to suppress high-frequency interference voltage peaks. The selection and control of signal-processing and evaluating units in center 3 are determined by a control and program unit 4 which will be understood to supply the threshold values for the discriminator and programs for sequencing and evaluating functions. If the evaluating units of the center include an analog computer, the computing programs for the latter are supplied by control unit 4. The selected output signal of the center is fed to the display unit 7, having a display screen for depicting the objects which have been evaluated in the field of view, along with the quantitative or qualitative result of having evaluated each such object, as may be necessary or desired. The more precise read-out and/or print-out of the measured value is effected at unit 8.

Figure 2:
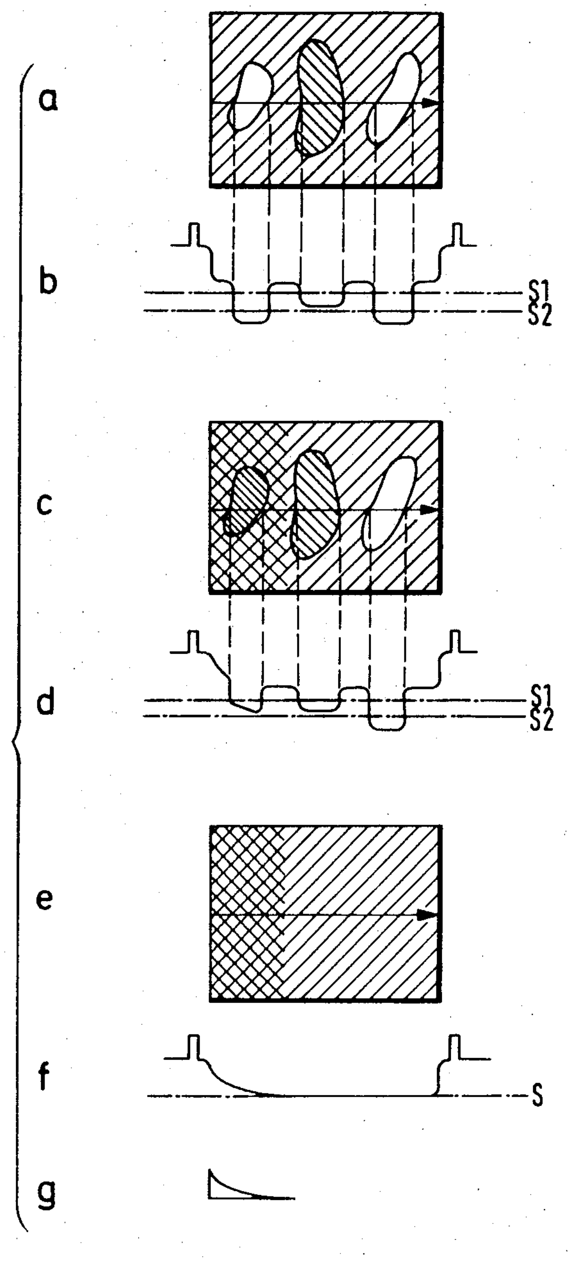
FIG. 2 is a succession of diagrams, to the same line-scan or time base, to show the effect of uneven illumination of a picture in stereometric analysis, as well as the principle of automatic correction of the picture background.

FIG. 2a is a TV display, as at 15, for an illustrative case in which the field of scan includes three objects, as taken through the microscope 1, said objects being displayed to stand out light from the dark background. The central object is slightly darker than the other two, as suggested by hatching. Furthermore, it is assumed in this ideal case that the object is illuminated completely evenly. The three objects are to be evaluated on the basis of the video signal supplied by the camera; and for the case of the scan line indicated by an arrow in FIG. 2a, the voltage course of the video signal is approximately as shown in FIG. 2b. By means of the two threshold values $S_1$ and $S_2$, whose potential with respect to the video signal is indicated by the two lines $S_1$ and $S_2$ parallel to the "black" shoulders of the line-synchronizing pulses, the video signal for the central object can be selected for stereometric evaluation, by separating the same from the other two on the basis of the brightness or density difference. If there should be several objects of the same gray tone or value, it will be clear that they may also be counted and evaluated separately.

In FIGS. 2a and 2b, it was assumed that the picture background, the illumination, and the sensitivity of the photosensitive surface of the television camera tube, are uniform over the entire scanned field of the raster or picture. But this is, in practice, an exceedingly rare situation. It frequently occurs that illumination is not uniform, or for some other reason the correct relative brightness of all scanned objects is not correctly displayed, and such circumstance is suggested by left-margin superposed hatched shading in FIG. 2c, to the extent that the video signal for the object on the left of the field now appears at a level close to that of the central object, as displayed in FIG. 2d for the case of the line scan shown by an arrow in FIG. 2c. With unchanged position and unchanged window width of the brightness-discriminator threshold values $S_1$ and $S_2$, the left object now is bracketed by the discriminator window and is falsely treated during evaluation, in the same manner as, and as if it should have been classified with, the central object.

In accordance with a feature of the invention, such an error is automatically corrected and avoided, using a "blind" picture of the field of the microscope, that is, an exposure of the field including specimen stage, but without the specimen; the video signals of this "blind" picture are stored at a first device 17 within storage means 6. As illustrated by FIG. 2e, the "blind" picture is shaded toward the left side, just as for the background in the display according to FIG. 2c. The voltage of the video signal of the scan line characterized by the arrow of FIG. 2e has about the course indicated in FIG. 2f. Since this signal has no high-frequency portions, and this is also the case for all other signals of "blind" pictures encountered in practice, it is preferably passed through a low-pass filter 5 to storage 6, in order to assure suppression of any interfering transient fluctuations in the course of the individual line scans of the raster. It should be noted that the video signal of the same single "blind" picture may be used to correct several successive pictures, for successive evaluation of the respective objects in the field. Furthermore, in the absence of suitable low-pass filtering, an interference pulse in the video signal of the "blind" picture could erroneously simulate a particle or object of the specimen, particularly when visually observing the display screen.

After the "blind" picture (i.e., a full raster of video signal representing the picture background) has been stored, the area of interest within the scanned field is set and scanned by the television camera. At the same time, the homologous video signals of the "blind" picture are called out from storage means 6 and are used as a control input to the video amplifier, as after processing in the center, i.e., in an analog computer, if provided. For example, a differential amplifier 25, accepting as one input the video signal depicted in FIG. 2f and as its other input a steady voltage at level $S_3$ (FIG. 2f), will produce an output voltage of the character represented in FIG. 2g, and the latter voltage may be directly used to control amplification of the video amplifier, such that the background of the objects appears uniformly light, as in FIG. 2a. For the subsequent stereometric analysis of the objects, all objects are thus presented for evaluation with brightness fidelity, as long as the above-described corrective technique is used.

In order to effectively eliminate, from a particular object evaluation, objects which are not of interest or which have already been evaluated, the output signals of the discriminator 26 are fed to one (e.g., 19) of the storage devices in storage means 6. Since the output signals of the discriminator are the signals which are evaluated, the storage device 19 records all signals which have already been evaluated. And if the output voltage of the storage device is used as a blanking control (during the subsequent scanning of the picture) for an electronic switch arranged ahead of the discriminator, then only new, and hence unevaluated, object information will be presented to the discriminator; in FIG. 1A, blanking-signal generating means 27 is shown as a generic indication of such means, suitably operative upon the video amplifier 12. It will be understood that since signals can be recorded and reproduced at the same time, using the storage means 6, the described process can be recycled and repeated. In this manner, objects of complex form can be evaluated automatically and in succession.

It will be seen that in the described method, it is no longer necessary to set two threshold values for sorting the picture components according to their gray tones or values; on the other hand, it suffices to select only a single threshold value. If the picture, for example according to FIG. 2a, is to be evaluated, this single threshold value is at first set to threshold value $S_2$. The two outer particles or objects are determined by the discriminator and can be evaluated. At the same time, the corresponding video signals are stored (i.e., for the two outer objects in the field). If the threshold value is now set to threshold value $S_1$ and the stored signal actuates the switch of blanking signal generator 27, which is operative for the full area of the already evaluated objects in the field, then in TV-scanning the field to evaluate the third or central object, only the central object will be selected or determined by the discriminator.

The distance or spread between two threshold-value settings defines the width of the discriminator window, and it will be understood that this window can have different widths, from one object-evaluating to the next such step, depending on requirements. Moreover, the step-by-step functioning of the discriminator, in conjunction with blanking control at 27, assures that each object is only determined once by the discriminator. The application of this method is not limited to the selection of objects according to their length or area, but the full raster of video signal for individual objects in the field can also be stored, for selective exclusion from the total picture display of the scanned field, as desired.

The foregoing discussion has not accounted for such improvement in signal-to-noise ratio as may be achieved in the storage process. The use of plate-storage techniques offers a simple possibility of reducing "cross-talk" or other internal interference, by storing the control video signal in several subsequent steps. During the first scanning of the picture, the video signal is stored on a first storage channel or surface, for example, the top side of a storage plate. When the picture is scanned the second time by the television camera, the video signals of the television camera and the video signals stored on the first storage surface are synchronously summed (i.e., for homologous elements of the raster or picture) and the summed signals at the same time are stored on a second storage channel or surface, for example, the underside of the storage plate. Thereafter, upon scanning the picture by the television camera the third time, the video signal is similarly summed with the video signal stored on the second storage surface (again, for homologous points) for storage on the first storage surface; and the process repeats for successive scans of the field, whether the ultimately stored signal is a "blind" exposure or an exposure to objects in the field. In this manner, the top side and the underside of the storage plate serve alternately as transmitter and receiver. It will be understood that instead of the top side and underside of the storage plate, two tracks or channels of a storage plate may be used. In any case, the technique of redundantly summing and entering into storage the video signals generated by successive raster scans provides statistically improved assurance against degrading influences of transient interference-voltage peaks or surges.

The indicated technique of reducing degradation, by building a full video raster on recycled storage is schematically illustrated for storage device 18 (FIG. 1A), it being assumed that *n*-recyclings are counted at 28, for storage increments of $1/n$-reduced magnitude, per cycle; the legend DPDT (double-pole, double-throw) suggests alternate reversal of storage-plate input and output connections, on each incremental-storage cycle, as described above. The *n*-recycled technique is employed at means 18 for the "blind" exposure, and may be similarly employed at 20 for object exposures, using the dashed line connections 22 or 22', as appropriate, to video amplifier 12 in place of the solid-line connection 21 shown, as will be understood.

It will be understood that for purposes of simplification, the full variety of selectable connections and controls for components in FIGS. 1 and 1A has been omitted, as for example output-control connections from or determined by the computer means at center 3. It will also be understood that the particular components shown at center 3 and storage means 6 are schematic and illustrative of the variety and flexibility with which the scanned video signal from TV camera 2 may be processed to yield selectively available and meaningful displays for object evaluations of improved accuracy. And the dashed-line connection 25' from amplifier 25 to scanner 2 will be understood to suggest optional use of the "blind" picture video to control scanner sensitivity, as generally discussed above.

What is claimed is:

1. Apparatus for evaluating certain objects within a field of raster-scanned subject matter, wherein an electrical video signal is produced for successive line scans of the field, comprising storage means synchronized with raster scanning and having the capacity of storing a raster of the video signal, video-amplifier means connected to amplify the video signal, and an amplitude-controlling connection to said video-amplifier means from the output of said storage means, whereby a first raster of video signal is stored as a control video signal, and then the stored video signal is used as a synchronous corrective control of the video amplifier during a subsequent scan of the field, signal-processing means including an amplitude discriminator connected to the output of said amplified, and blanking signal generating means having an input connected for response to the output of said discriminator, said blanking-signal generating means having a control connection to said video amplifier, whereby an object first selected by said discriminator for evaluation is the basis of its own elimination from the raster of video signal for subsequent raster scan to encompass another object in the field.

2. Apparatus according to claim 1, in which storage means synchronous with raster-scanning is included in the amplitude-controlling connection of said discriminator output to said video amplifier.

3. The method of evaluating certain objects within a field of raster-scanned subject matter, wherein an electrical video signal is produced for successive line scans of the field, which comprises utilizing a first level of amplitude discrimination to select a first particular scanned object for evaluation to the exclusion of another scanned object, raster-scanning the thus-selected field to generate and store a video signal unique to the first evaluated object, utilizing a second level of amplitude discrimination to select a second particular scanned object for evaluation, and utilizing the stored first signal in synchronism with raster scanning of the field at the second discrimination level to blank out video signals attributable to the first evaluated object while scanning to develop a video signal unique to the second evaluated object.

4. The method of evaluating certain objects within a field of raster-scanned subject matter, wherein an electrical video signal is produced for successive line scans of the field, which comprises utilizing amplitude discrimination to select a particular scanned object for evaluation to the exclusion of another scanned object, scanning the thus-selected field to generate and store control video signal unique to the evaluated object, and utilizing the stored signal in synchronism with a subsequent raster scan of said field to blank out video signals attributable to the evaluated object.

5. The method of claim 4, in which the video signal processed for storage is subjected to low-pass filtering before utilizing the same to modify the video-signal development produced by scanning the field.

6. The method of claim 4, in which video signal unique to the evaluated object is stored prior to said blank-out use, so that video signal unique to the evaluated object is always blanked from video produced on subsequent scans of the field.

7. The method of claim 6, in which amplitude-discrimination is employed to select another particular scanned object for evaluation to the exclusion of a still further scanned object, and in which video signal unique to said other scanned object is added to storage of the video signal unique to the first-evaluated object, whereby blanking excludes video signal development for the first and second evaluated objects when scanning the field for evaluation of the said still further scanned object.

8. The method of evaluating an object within a field of raster-scanned subject matter, wherein an electrical video signal is produced for successive line scans of the field, which comprises generating and storing a control video signal by successively scanning said field for $n$-rasters, regulating the video input to storage for each raster scan to a maximum level which is substantially $1/n$th of the maximum amplitude capacity for storage, whereby random interfering voltage transient effects are minimized in the storage of $n$ raster scans, and utilizing the stored signal in synchronism with subsequent scan of said field to modify the amplitude of the video-signal generated during said scan.

9. The method of claim 8 wherein the $n$-rasters of scan are relied upon to produce the stored signal while scanning the field in the absence of the object.

10. The method of claim 8 wherein the $n$-rasters of scan are relied upon to produce a stored signal while scanning the field when it contains the object.

* * * * *